US011119358B2

(12) United States Patent
Chen et al.

(10) Patent No.: US 11,119,358 B2
(45) Date of Patent: Sep. 14, 2021

(54) BACKLIGHT STRUCTURE AND LIQUID CRYSTAL DISPLAY

(71) Applicant: HUIZHOU CHINA STAR OPTOELECTRONICS TECHNOLOGY CO., LTD., Huizhou (CN)

(72) Inventors: Shengchung Chen, Huizhou (CN); Gang Yu, Huizhou (CN); Dehua Li, Huizhou (CN)

( * ) Notice: Subject to any disclaimer, the term of this patent is extended or adjusted under 35 U.S.C. 154(b) by 315 days.

(21) Appl. No.: 16/339,366

(22) PCT Filed: Jan. 4, 2019

(86) PCT No.: PCT/CN2019/070393
§ 371 (c)(1),
(2) Date: Apr. 4, 2019

(87) PCT Pub. No.: WO2020/118810
PCT Pub. Date: Jun. 18, 2020

(65) Prior Publication Data
US 2021/0165282 A1    Jun. 3, 2021

(30) Foreign Application Priority Data
Dec. 13, 2018   (CN) .......................... 201811527455.3

(51) Int. Cl.
*G02F 1/1335* (2006.01)
*G02F 1/1333* (2006.01)
*G02F 1/1339* (2006.01)

(52) U.S. Cl.
CPC ...... *G02F 1/133628* (2021.01); *G02F 1/1339* (2013.01); *G02F 1/133314* (2021.01); *G02F 1/133331* (2021.01); *G02F 1/133528* (2013.01)

(58) Field of Classification Search
CPC ......... G02F 1/133331; G02F 1/133314; G02F 1/133528; G02F 1/1339; G02F 1/133628; G02B 6/0088
See application file for complete search history.

(56) References Cited

U.S. PATENT DOCUMENTS

| 9,933,564 B2* | 4/2018 | Ma ........................ G02B 6/0091 |
| 2006/0170839 A1* | 8/2006 | Yamamoto ........ G02F 1/133308 349/58 |
| 2012/0287373 A1 | 11/2012 | Tsai |
| 2013/0070475 A1* | 3/2013 | Youk ................. G02F 1/133308 362/602 |

(Continued)

FOREIGN PATENT DOCUMENTS

| CN | 202266936 U | 6/2012 |
| CN | 102588906 A | 7/2012 |

(Continued)

*Primary Examiner* — Zheng Song (57) ABSTRACT

The present invention provides a backlight structure and a liquid crystal display. The backlight structure includes a heat sink, a glass back plate, a locking member and a buckle. The heat sink includes a first heat dissipation plate and a second heat dissipation plate. The glass back plate is disposed opposite to the heat dissipation plate. The buckle is connected to the glass back plate and the heat sink. A gap is formed between the glass back plate and the first heat dissipation plate. The liquid crystal display includes the above backlight structure.

9 Claims, 12 Drawing Sheets

(56) References Cited

U.S. PATENT DOCUMENTS

| | | | |
|---|---|---|---|
| 2013/0215356 A1 | 8/2013 | Yu | |
| 2014/0022483 A1* | 1/2014 | Kuo | H05K 7/18 |
| | | | 349/58 |
| 2014/0029294 A1 | 1/2014 | Huang | |
| 2014/0055710 A1 | 2/2014 | Yu | |
| 2014/0118627 A1 | 5/2014 | Sasaoka | |
| 2014/0140097 A1 | 5/2014 | Hsiao | |
| 2015/0055026 A1* | 2/2015 | Ikuta | G02F 1/133524 |
| | | | 348/791 |
| 2015/0124177 A1 | 5/2015 | Ikuta | |
| 2015/0146110 A1* | 5/2015 | Matsukawa | G02B 6/0091 |
| | | | 348/790 |
| 2015/0253496 A1* | 9/2015 | Hsiao | G02B 6/0091 |
| | | | 362/611 |
| 2015/0331177 A1 | 11/2015 | Zhou et al. | |
| 2016/0139330 A1* | 5/2016 | Kawabata | F21V 29/507 |
| | | | 362/611 |
| 2017/0205573 A1* | 7/2017 | Ma | G02B 6/0088 |
| 2017/0212299 A1* | 7/2017 | Matsui | G02B 6/0051 |
| 2018/0173031 A1* | 6/2018 | Yu | G02B 6/0055 |

FOREIGN PATENT DOCUMENTS

| | | |
|---|---|---|
| CN | 202303005 U | 7/2012 |
| CN | 102767762 A | 11/2012 |
| CN | 102809836 A | 12/2012 |
| CN | 102927543 A | 2/2013 |
| CN | 103398325 A | 11/2013 |
| CN | 103792728 A | 5/2014 |
| CN | 104006332 A | 8/2014 |
| CN | 203759385 U | 8/2014 |
| CN | 104471305 A | 3/2015 |
| CN | 206805044 U | 12/2017 |

\* cited by examiner

BACKLIGHT STRUCTURE AND LIQUID CRYSTAL DISPLAY

FIELD OF INVENTION

The present invention relates to backlight technologies of liquid crystal display, and more particularly, to a backlight structure and a liquid crystal display.

BACKGROUND OF INVENTION

With development of liquid crystal display (LCD) television (TV) technologies, the forms of TVs are constantly upgraded. Glass material has replaced metal material to be mostly used as a back panel of the LCD TV, which is an innovation of the form of TV products. Compared with the traditional metal material, glass material has a flat and smooth surface and a capability of screen-printing or etching different appearance patterns. It can greatly attract consumers' attention, and the consumers are more inclined to purchase such type of TVs. However, glass back plates have certain processing restrictions compared with traditional metal back plates. The drawing of a convex hull or tapping cannot be realized, make it difficult to cooperate with other components.

Figure 1:
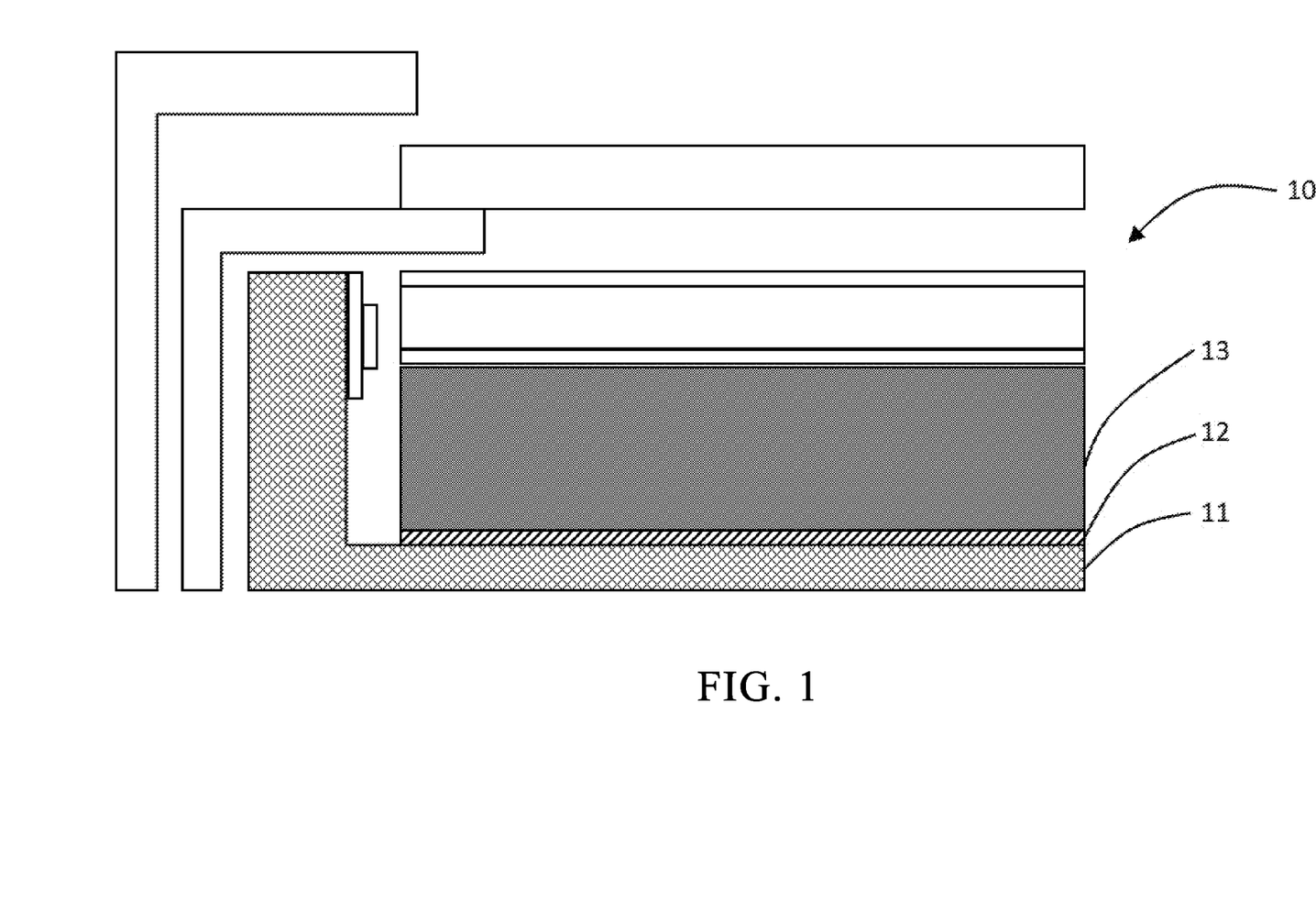
FIG. 1 is a schematic structural view of a backlight structure of the prior art.

As shown in FIG. 1, in backlight structure 10 of prior art, a heat sink 11 is adhered to a glass back plate 13 by structural adhesive 12. This is disadvantageous for reworking. Besides, heat of the heat sink 11 is easily transmitted to the glass back plate to cause films to wave, and thereby causing image abnormality, and reducing the reliability of a module.

SUMMARY OF INVENTION

An objective of the present invention is to provide a backlight structure and a liquid crystal display, which can effectively solve the problems such as poor heat dissipation, hard to rework and reduced reliability.

In order to solve the above technical problem, the disclosure provides a backlight structure including a heat sink, a glass back plate, a locking member and a buckle. The heat sink further includes a first heat dissipation plate. The glass back plate is disposed opposite to the heat dissipation plate. The buckle is connected to the glass back plate and the heat sink, and a gap is formed between the glass back plate and the first heat dissipation plate.

Further, the buckle is detachably connected to the heat sink; and/or, the buckle is detachably connected to the glass back plate.

Further, the heat sink includes a heat sink through hole formed through the first heat dissipation plate. The buckle includes a buckle body and a first groove. The first groove is a recess on a bottom surface of the buckle body and is disposed opposite to the heat sink through hole. The locking member is detachably inserted into the heat sink through hole and a buckle groove, and screwed to the heat sink and the buckle.

Further, the glass back plate includes a glass plate body and a glass plate through hole formed through the glass plate body. The buckle includes a buckle body and a second groove. A part of the buckle body is inserted into the glass plate through hole. The second groove is recessed from one side surface of the buckle body, and a part of the glass plate body is clamped into the second groove.

Further, the glass back plate includes a glass plate boss protruded from an inner side wall of the glass plate through hole. The glass plate boss is clamped into the second groove.

Further, the glass plate body at the edge of the glass plate through hole is partially clamped into the second groove.

Further, the backlight structure further includes a gasket layer disposed on the upper surface of the glass back plate. The gasket layer includes a third through hole disposed opposite to the glass plate through hole. The top of the buckle is inserted into the third through hole.

Further, the heat sink includes a second heat dissipation plate perpendicularly connected to one end of the first heat dissipation plate. The backlight structure further includes resin frames and back frames. The resin frame includes a first resin frame and a second resin frame. The second resin frame is disposed above the second heat dissipation plate and parallel with the first heat dissipation plate. The first resin frame is disposed opposite to the second heat dissipation plate and perpendicularly connected to the first resin frame. The back frame includes a first back frame and a second back frame. The first back frame is disposed opposite to the first resin frame and parallel with the first resin frame. The second back frame is perpendicularly connected to one end of the first back frame, and is disposed above the second resin frame.

Further, the backlight structure further includes a polarizer, a light guide plate, a film, a light bar and a backlight source. The polarizer is attached to one side of the glass back plate or the gasket layer opposite to another side facing the first heat dissipation plate. The light guide plate is attached to one side of the polarizer opposite to another side facing the glass back plate. The film is attached to one side of the light guide plate opposite to another side facing the polarizer. The backlight source is disposed on one side of the second heat dissipation plate facing the light guide plate.

Further, the present invention further provides a liquid crystal display, including the above backlight structure.

The present invention provides the backlight structure and the liquid crystal display. A through hole structure is formed in the glass substrate, and the buckle is clamped between the heat sink and the glass substrate, to separate the heat sink and the glass substrate for certain distance to form the gap. In this way, the product of backlight structure can be easily reworked, the heat can be better dissipated by air in the gap, and the heat sink is prevented from conducting heat to the glass back plate, so that the reliability of the module is greatly improved.

BRIEF DESCRIPTION OF DRAWINGS

To more clearly illustrate the technical solutions of the embodiments of the present invention, the following will briefly describe the drawings to be used in the description of the embodiments. It will be apparent that the drawings in the following description are merely some embodiments of the present invention, and those skilled in the art may obtain other drawings on the basis of these drawings without any creative effort.

DETAILED DESCRIPTION OF PREFERRED EMBODIMENTS

The embodiments of the present invention are described in detail below. Examples of the embodiments are shown in the accompanying drawings. Throughout the specification, same or similar reference numerals represent same or similar elements or elements having same or similar functions. The embodiments described below with reference to the accompanying drawings are exemplary, and are merely used for explaining the present invention, but should not construed as limiting the present invention.

In the descriptions of the present invention, it should be understood that orientations or position relationships indicated by terms such as "center", "longitudinal", "lateral", "length", "width", "thickness", "above", "below", "front", "rear", "left", "right", "vertical", "horizontal", "top", "bottom", "inside", "outside", "clockwise", and "anticlockwise" are orientations or position relationships indicated based on the accompanying drawings, and are used merely for ease of describing the present invention and of simplified descriptions rather than for indicating or implying that an apparatus or a component needs to have a particular orientation or needs to be constructed or operated in a particular orientation, and therefore, cannot be construed as a limit to the present invention. In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include one or more such features. In the descriptions of the present invention, unless otherwise explicitly specified, "multiple" means two or more than two.

In the description of the present invention, it should be noted that, unless otherwise explicitly stipulated and restricted, terms "installation", "joint connection", and "connection" should be understood broadly, which, for example, may be a fixed connection, or may be a detachable connection, or an integral connection; or may be a mechanical connection, or may be an electrical connection, or may be mutual communication; or may be a direct connection, or may be an indirect connection by using a medium, or may be an internal communication between two components, or may be an interactive relationship between two components. Those of ordinary skill in the art can understand the specific meanings of the above terms in the present invention according to actual situations.

In the present invention, unless otherwise explicitly stipulated and restricted, that a first feature is "on" or "under" a second feature may include that the first and second features are in direct contact, or may include that the first and second features are not in direct contact but in contact by using other features therebetween. In addition, that the first feature is "on", "above", or "over" the second feature includes that the first feature is right above and on the inclined top of the second feature or merely indicates that a level of the first feature is higher than that of the second feature. That the first feature is "below", "under", or "beneath" the second feature includes that the first feature is right below and at the inclined bottom of the second feature or merely indicates that a level of the first feature is lower than that of the second feature.

Various different embodiments or examples are provided below to implement the different structures of the present invention. To simplify the disclosure of the present invention, components and configurations in particular examples are described below. Definitely, they are merely examples and are not intended to limit the present invention. In addition, in the present invention, reference numerals and/or reference letters may be repeated in different examples. The repetition is for the purposes of simplicity and clarity, and does not indicate any relationship between the discussed implementations and configurations. Moreover, the present invention provides examples of various particular processes and materials, but those of ordinary skill in the art may be aware of application of another process and/or use of another material.

Embodiment 1

As shown in FIG. 2 to FIG. 8, embodiment 1 provides a backlight structure including a heat sink 21, a glass back plate 22, a locking member 214, and at least one buckle 218. The heat sink 21 further includes a first heat dissipation plate 21a and a second heat dissipation plate 21b. The second heat dissipation plate 21b is perpendicularly connected to one end of the first heat dissipation plate 21a. The glass back plate 22 is disposed opposite to the first heat dissipation plate 21a. Each buckle 218 connects the glass back plate 22 and the heat sink 21. A gap is formed between the glass back plate 22 and the first heat dissipation plate 21a. The buckle 218 is detachably connected to the heat sink 21, and/or the buckle 218 is detachably connected to the glass back plate 22. The buckle 218 may form a gap between the glass back plate and the heat sink, so that the glass back plate is not affected by heat, and prevented from overheating. The product of backlight structure can be easily reworked. The present embodiment includes a plurality of buckles 218 fixed at the heat sink more steadily by the locking member 214. The buckles 218 are easy to process and convenient to detach, and are favorable for maintaining and reworking devices on the heat sink 21.

Figure 2:
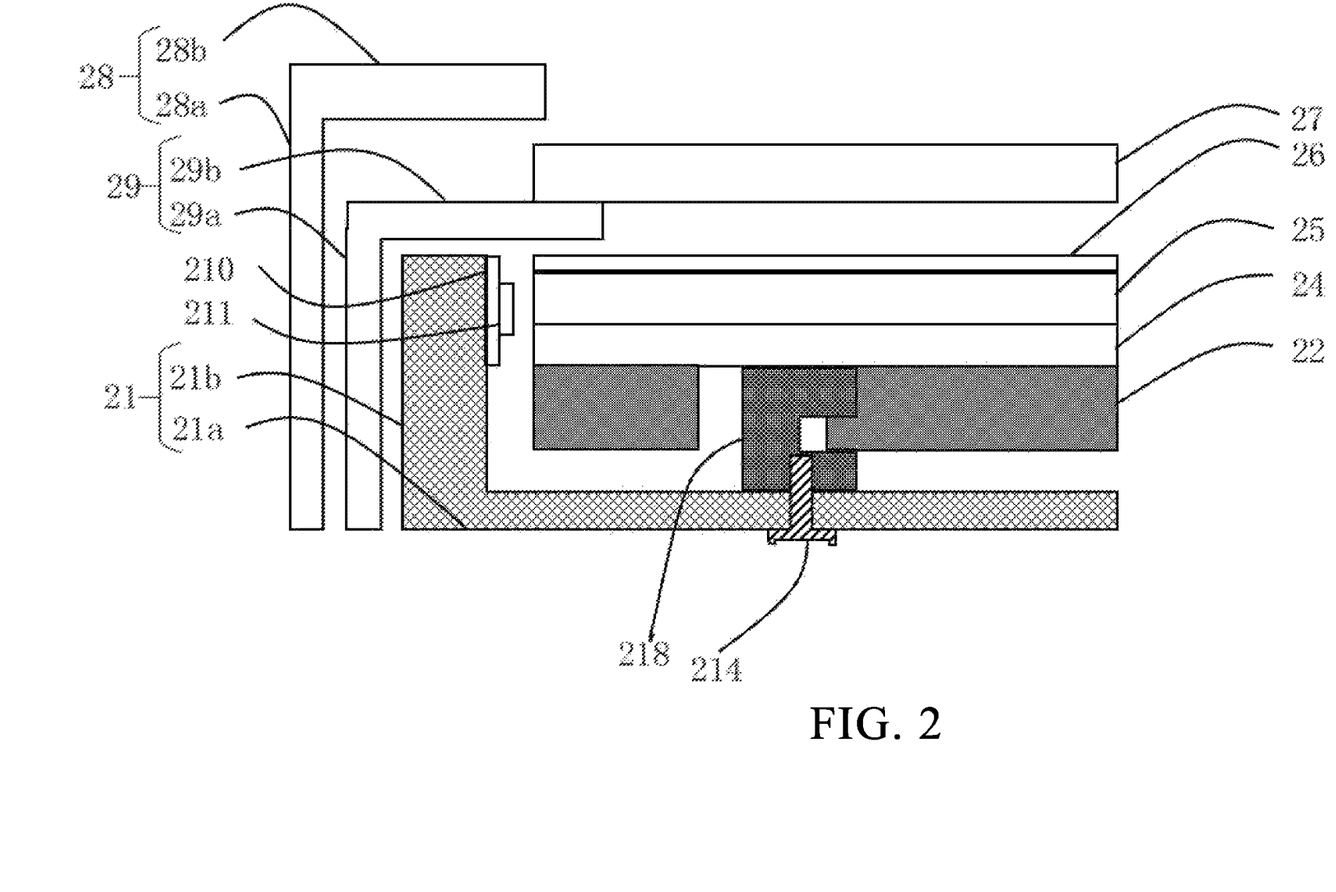
FIG. 2 is a schematic structural view of a backlight structure of Embodiment 1.
Figure 3:
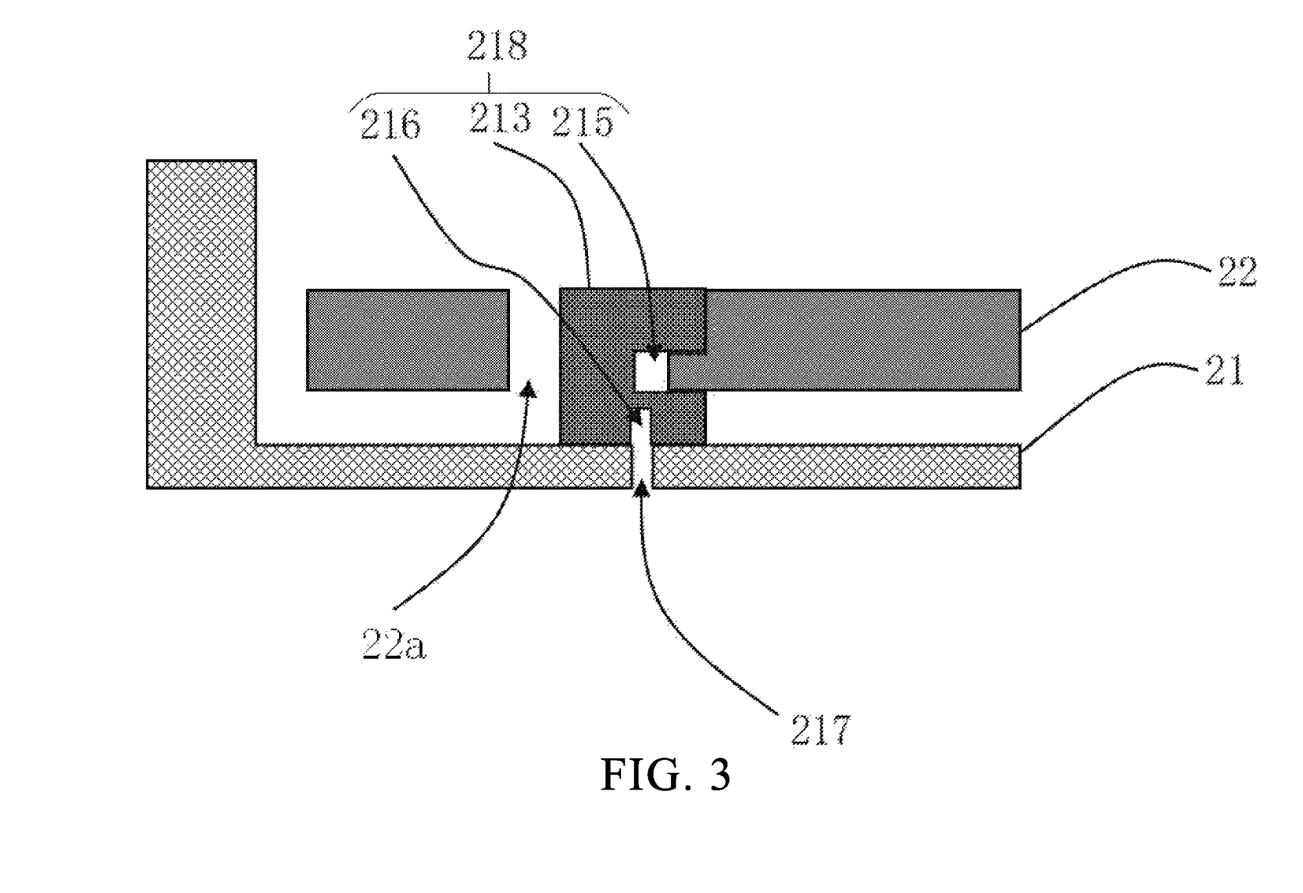
FIG. 3 is a schematic longitudinal sectional view of structure of a heat sink, a buckle and a glass back plate of Embodiment 1.
Figure 4:
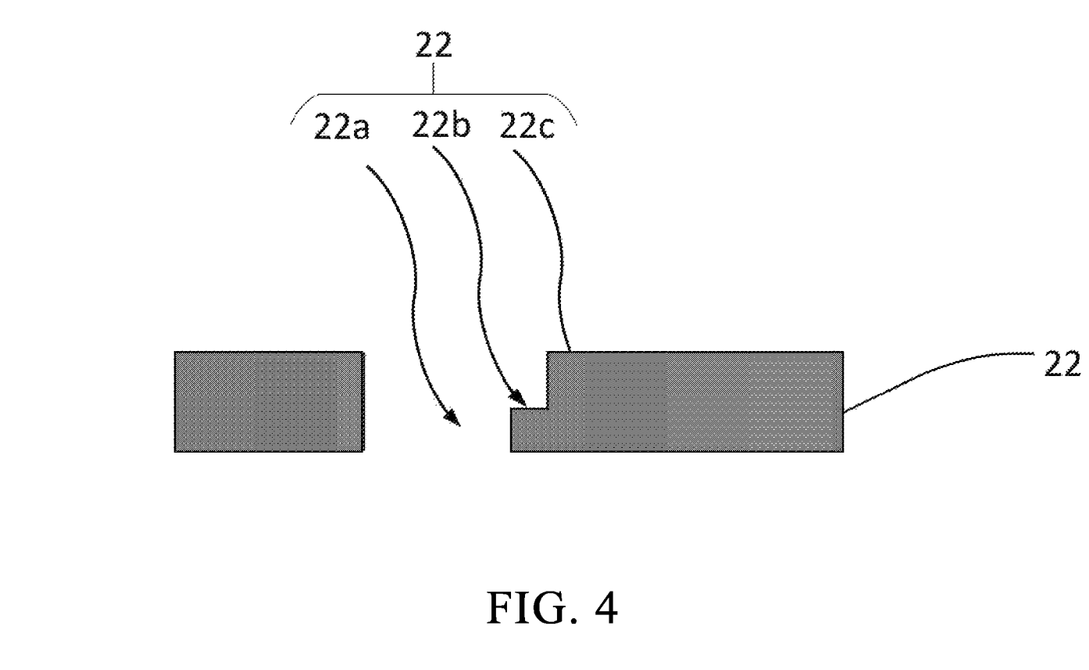
FIG. 4 is a schematic structural view of a through hole and a boss on a glass back plate of Embodiment 1.
Figure 5:
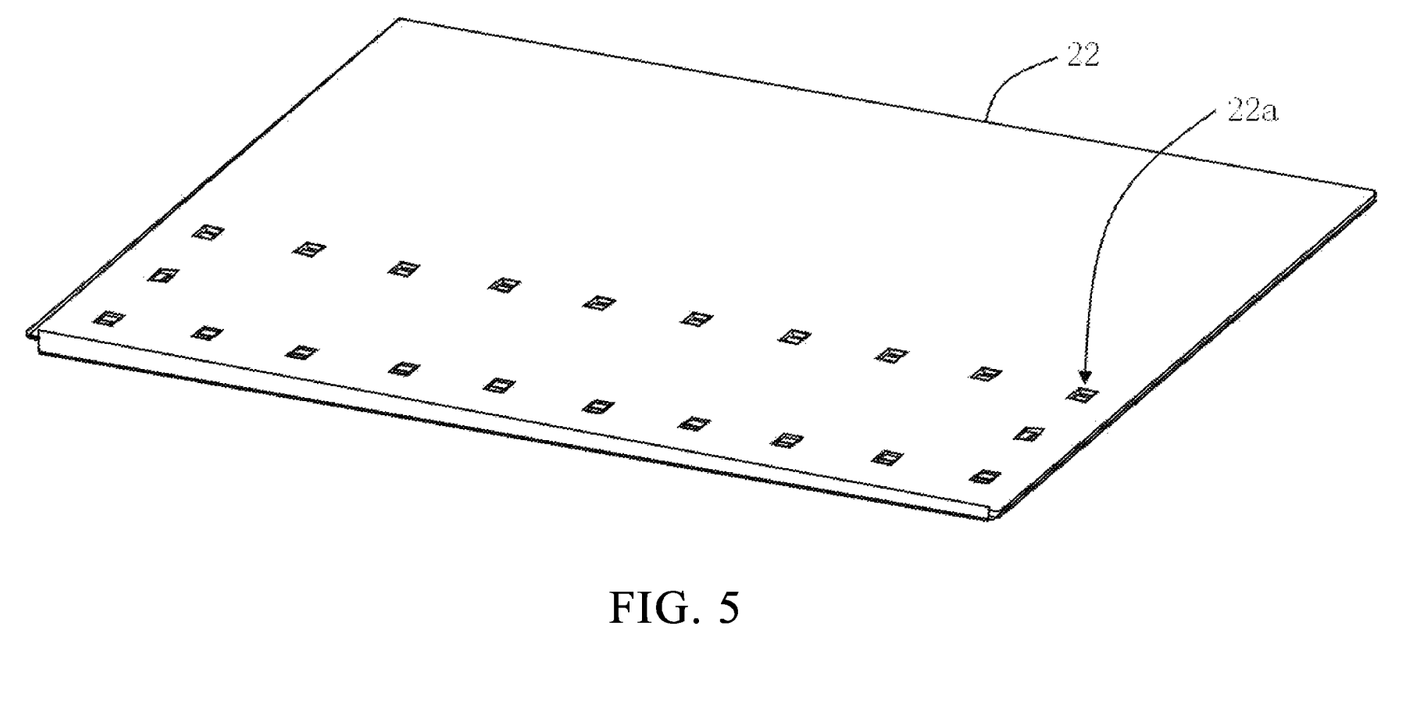
FIG. 5 is a schematic structural view of the glass back plate of Embodiment 1.
Figure 6:
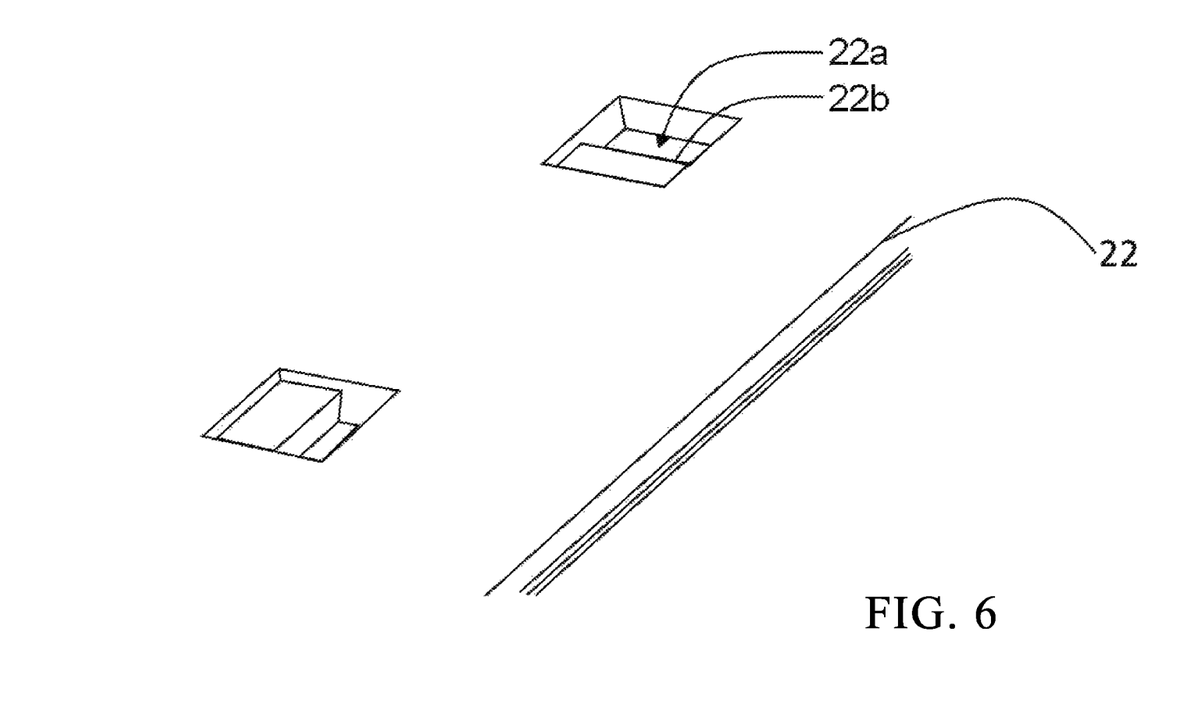
FIG. 6 is a partially enlarged schematic structural view of an through hole in the glass back plate of Embodiment 1.
Figure 7:
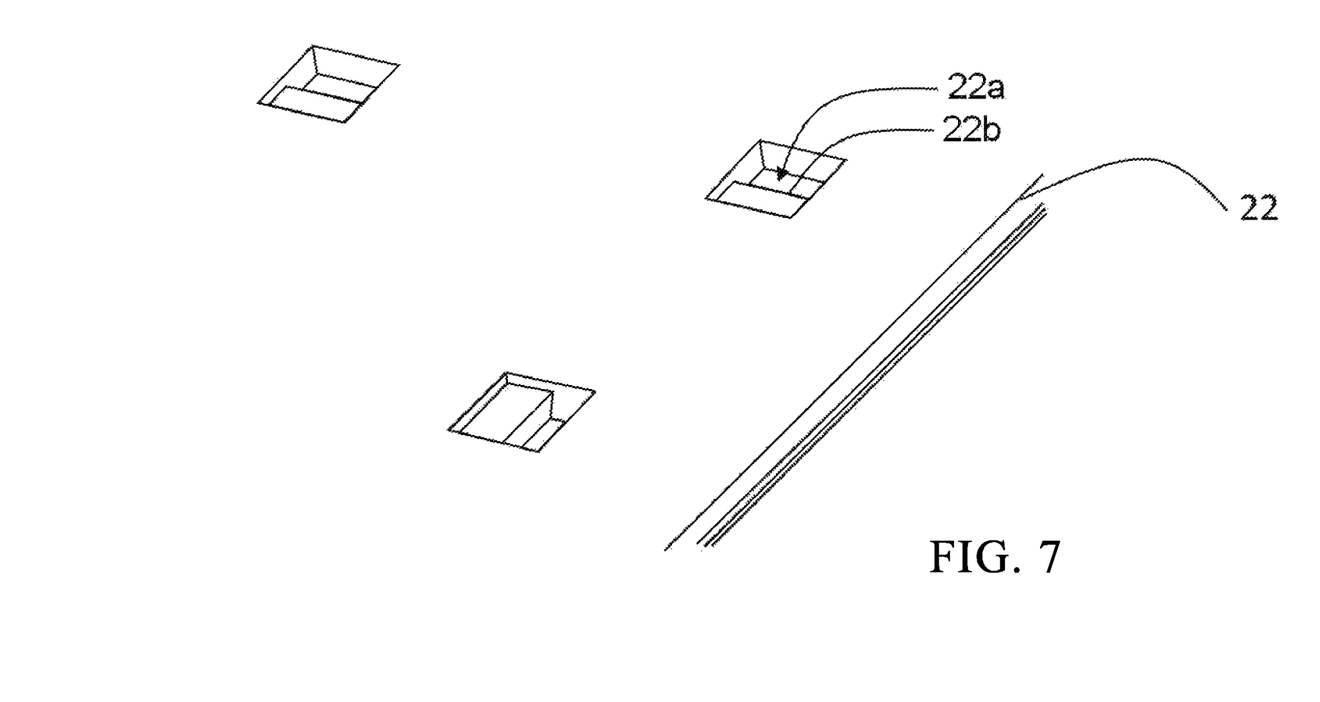
FIG. 7 is a schematic structural view of the glass back plate, the buckle, and a through hole structure of Embodiment 1.
Figure 8:
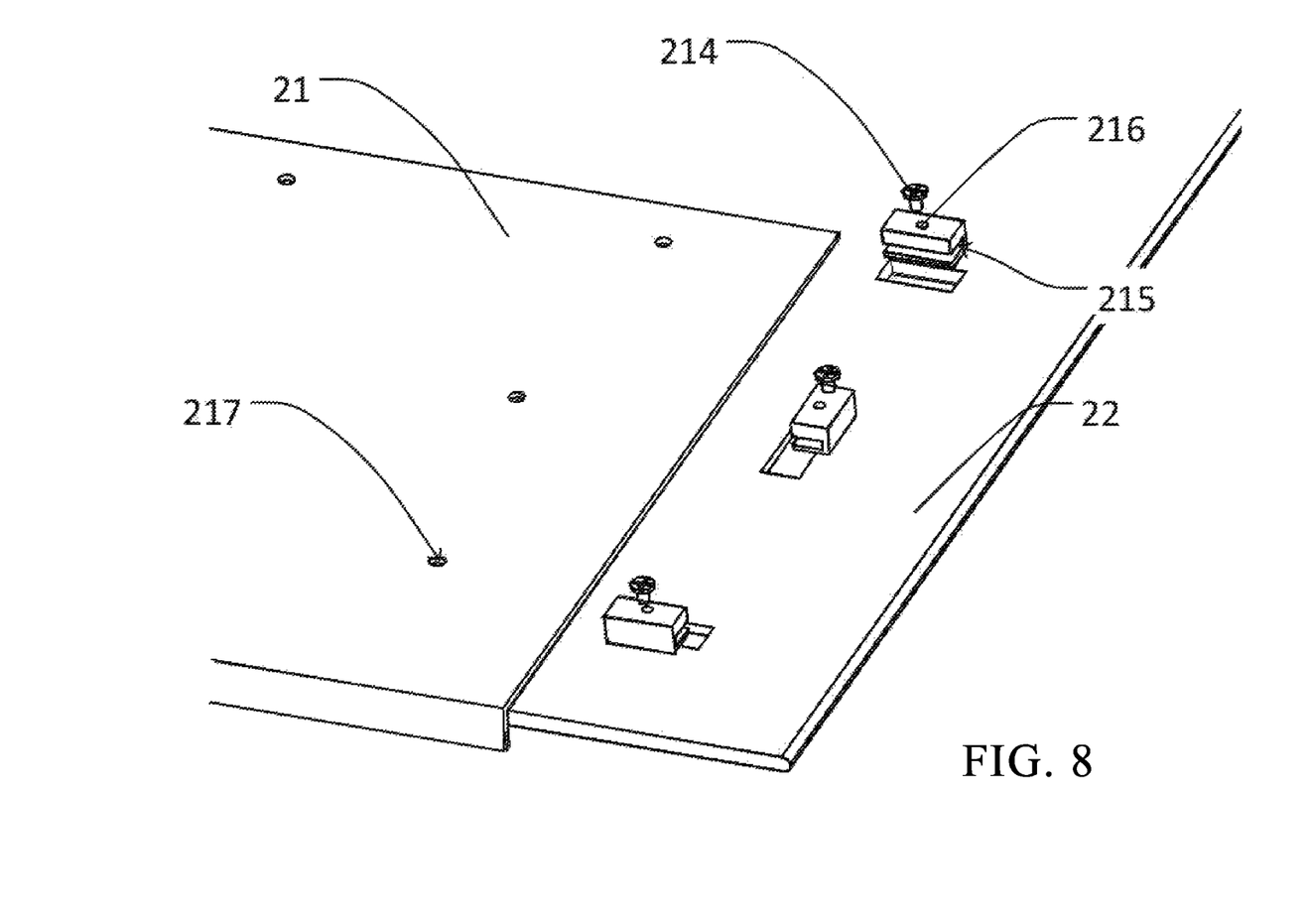
FIG. 8 is a schematic structural view of the glass back plate, the buckle, the heat sink and a locking member of Embodiment 1.

The heat sink 21 includes a heat sink through hole 217. The heat sink through hole 217 is formed through the first heat dissipation plate 21a. The buckle 218 includes a buckle body 213 and a first groove 216. The first groove 216 is recessed from the bottom surface of the buckle body 213 and is disposed opposite to the heat sink through hole 217. The locking member 214 is detachably inserted into the heat sink through hole 217 and the first groove 216. The locking member 214 is screwed to the heat sink 21 and the buckle 218. The locking member 214 fixes the buckle 218 on the heat sink 21 to stabilize the same. It is easily to rework when there is a problem during processing.

The glass back plate 22 includes a glass plate body 22c, two or more glass plate through holes 22a and a boss 22b. Each glass plate through hole 22a is formed through the glass plate body 22c. The buckle 218 includes a buckle body 213 and a second groove 215. A part of the buckle body 213 is inserted into the glass plate through hole 22a. The second groove 215 is recessed from a side surface of the buckle body 213. The glass plate boss 22b protrudes from the inner side wall of the glass plate through hole 22a. The glass plate boss 22b is clamped into the second groove 215, so that the glass back plate 22 can be more stably clamped with the buckle 218, and be steadily disposed in the backlight structure. The present embodiment is applicable to the case where the glass back plate is relatively thick, thus, the upper end of the buckle body 213 is flush with the upper surface of the glass back plate 22, and the assembling of the components such as the light guide plate and the polarizer on the upper surface of the glass back plate 22 is not affected. The heat sink 21 can be separated from the glass back plate 22 by the buckle 218, and a gap exists therebetween, so that the heat dissipation does not affect the glass back plate 22, and such structure is favorable for reworking of the product.

The backlight structure further includes back frames 28, resin frames 29, a polarizer 24, a light guide plate 25, a film 26, a light bar 210 and a backlight source 211. The resin frames 29 include a first resin frame 29a and a second resin frame 29b. The second resin frame 29b is disposed above the second heat dissipation plate 21b and parallel with the first heat dissipation plate 21a. The first resin frame 29a is disposed opposite to the second heat dissipation plate 21b. The second resin frame 29b is perpendicularly connected to the one end of the first resin frame 29a. The back frames 28 include a first back frame 28a and a second back frame 28b. The first back frame 28a is disposed opposite to the first resin frame 29a and parallel with the first resin frame 29a. The second back frame 28b is perpendicularly connected to one end of the first back frame 28a and is disposed above the second resin frame 29b. The polarizer 24 is attached to one side of the glass back plate 22 opposite to another side facing the first heat dissipation plate 21a. The light guide plate 25 is attached to one side of the polarizer 24 opposite to another side facing the glass back plate 22. The film 26 is attached to one side of the light guide plate 25 opposite to another side facing the polarizer 24. The light bar 210 is attached to the inner side surface of the second heat dissipation plate 21b. The backlight source 211 is attached to one side of the light bar 210 opposite to another side facing the second heat dissipation plate 21b. The backlight source 211 is disposed opposite to the side surface of the light guide plate. The light of the backlight source 211 is emitted from the upper surface of the film 26 via the polarizer 24, the light guide plate 25 and the film 26 to form a light-emitting effect.

The present embodiment provides the backlight structure. A plurality of glass plate through holes are disposed on the glass back plate. A plurality of screw holes are disposed on the heat sink. The glass back plate is fixedly mounted on the heat sink by a plurality of buckles, so that the gap is formed between the heat sink and the glass back plate, and thermal insulation is achieved by air. The heat dissipated by the heat sink is effectively prevented from causing overheating of the glass back plate, and thereby the backlight structure can be easily reworked and has good reliability.

The present embodiment further provides a liquid crystal display, including the above backlight structure. The glass back plate of the liquid crystal display panel does not generate the phenomenon of overheating, and the backlight structure can be easily reworked and has good reliability.

Embodiment 2

As shown in FIG. 9 to FIG. 12, since a part of the edge of the through hole of the glass back plate of embodiment 1 is a lug and is not easy to process, the present invention also provides Embodiment 2. Embodiment 2 is the same as most of the technical solution of embodiment 1 and differs in that part of the glass plate body 32a is clamped into the second groove 315. In particular, the glass plate body 32a at the edge of the glass plate through hole 32b is partially clamped into the second groove 315. The backlight structure further includes a gasket layer 33. The gasket layer 33 is disposed on the upper surface of the glass back plate 32. The gasket layer 33 includes a third through hole 33b disposed opposite to the glass plate through hole 32b. The top of the buckle 318 is inserted into the third through hole 33b. The manufacturing manner of Embodiment 2 is simpler and more efficient than the manufacturing manner of Embodiment 1.

Figure 9:
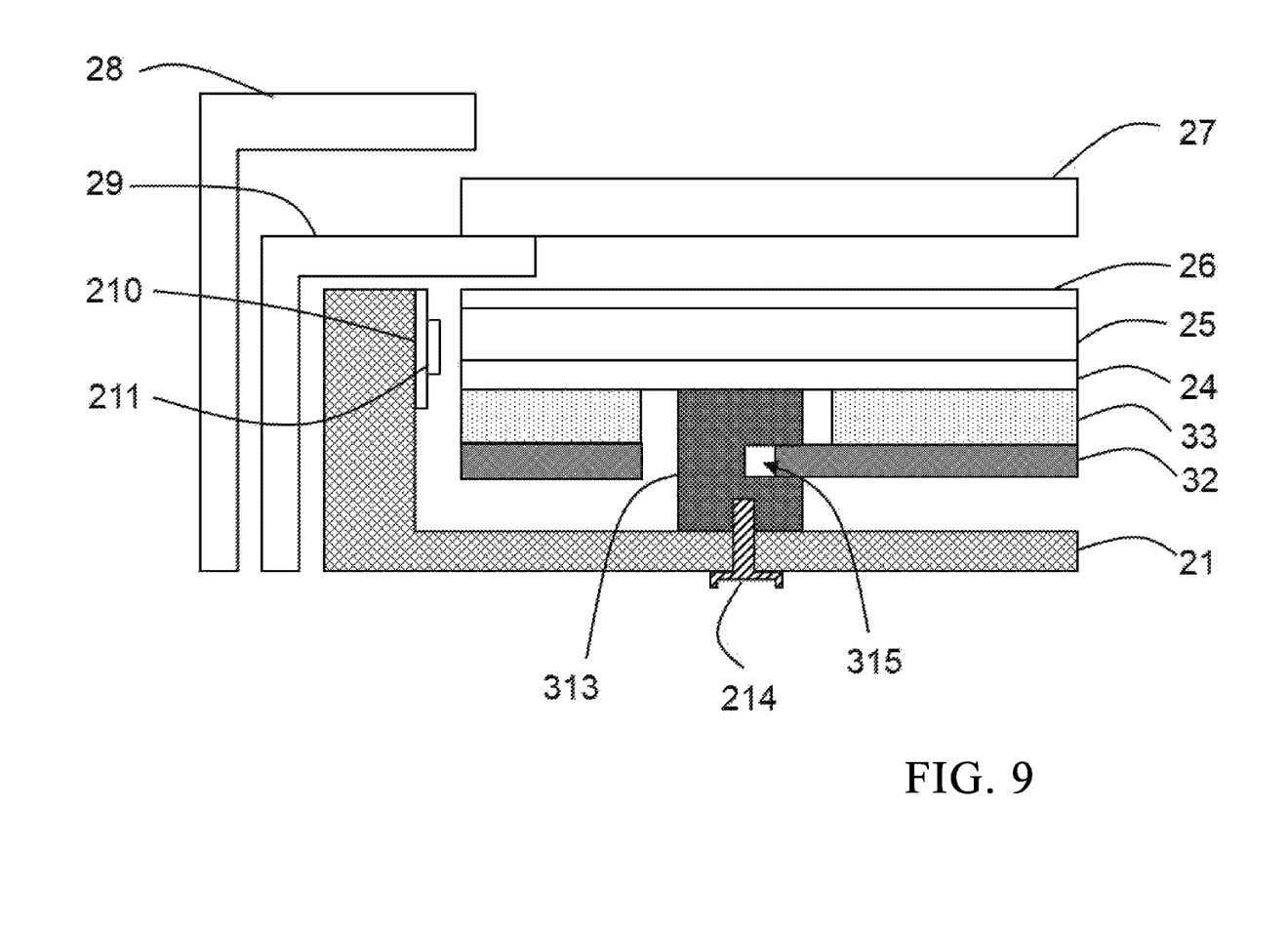
FIG. 9 is a schematic structural view of a backlight structure of Embodiment 2.
Figure 10:
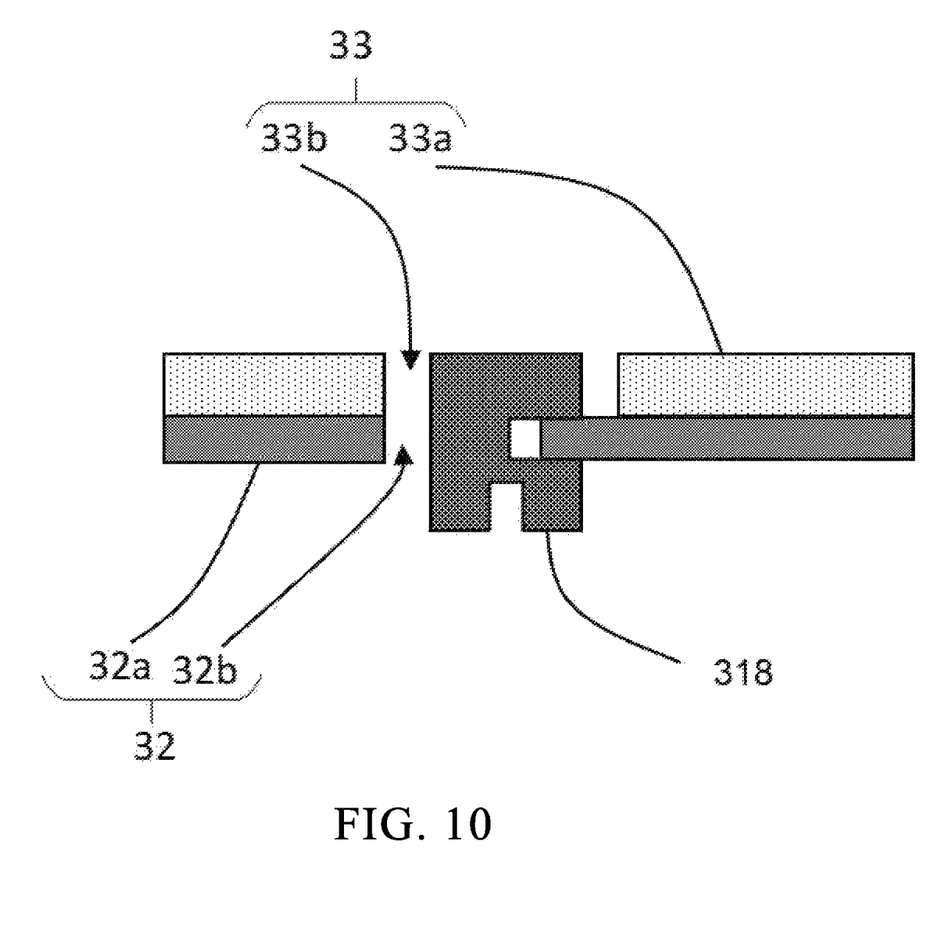
FIG. 10 is a schematic structural view of the glass back plate, the buckle, and a gasket layer of Embodiment 2.
Figure 11:
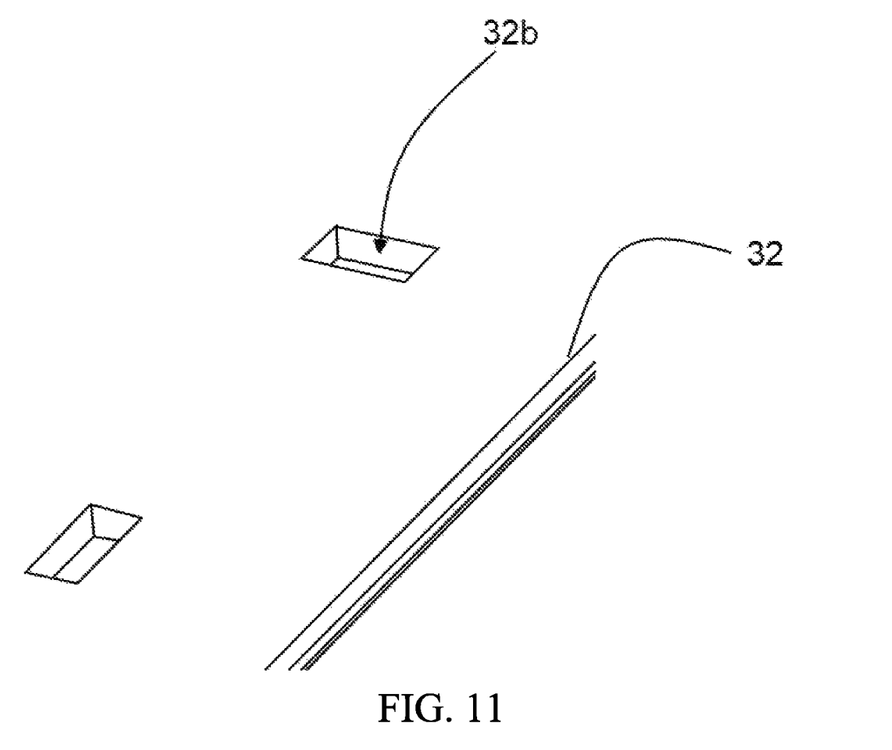
FIG. 11 is a schematic structural view of the through hole of a glass back plate of Embodiment 2.
Figure 12:
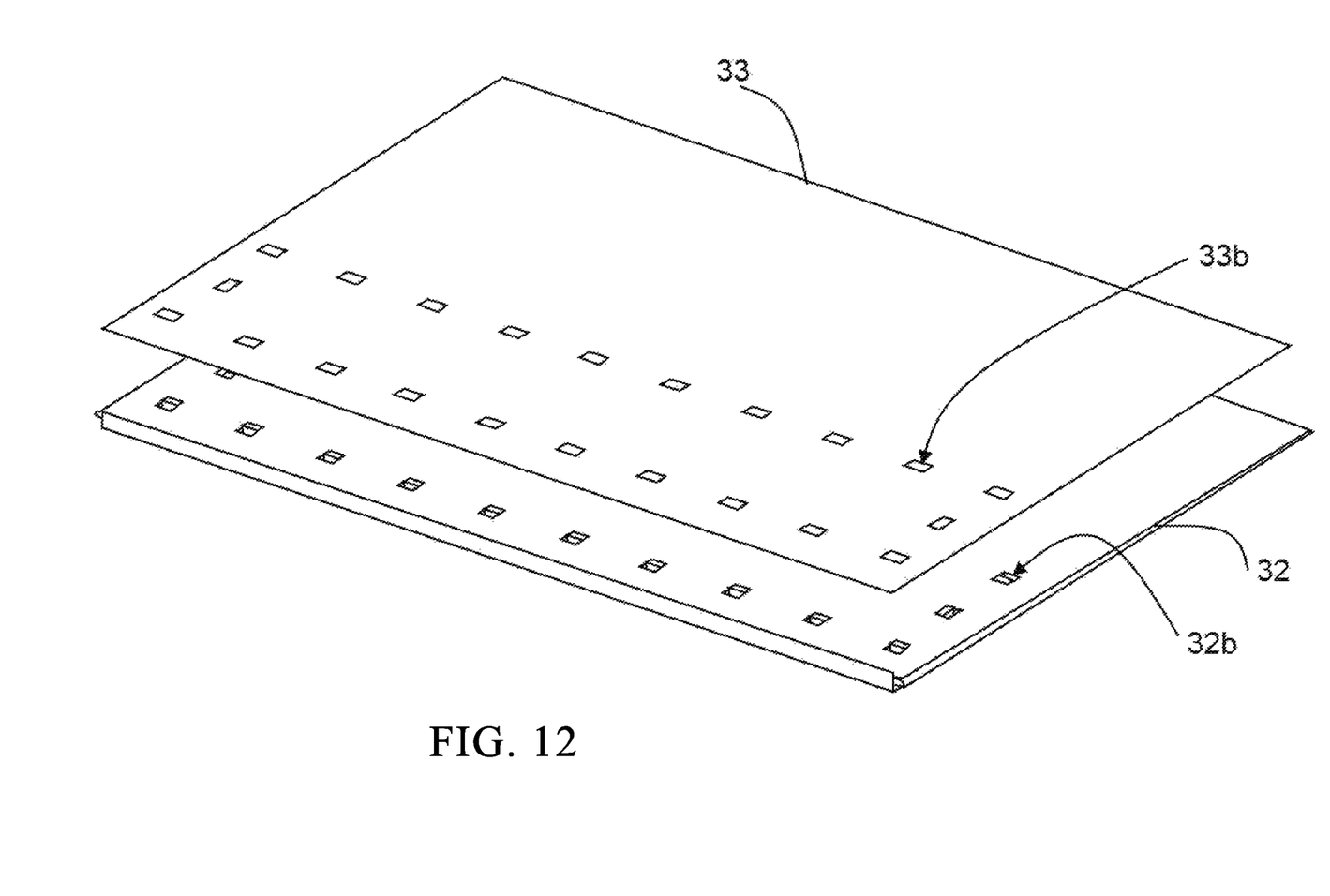
FIG. 12 is a schematic structural view of the glass back plate and the gasket layer of Embodiment 2.

The present embodiment is applicable to the case where the glass back plate is relatively thin. The upper end of the buckle body 313 is flush with the upper surface of the gasket layer 33. The assembling of the components such as the light guide plate and the polarizer on the upper surface of the glass back plate 32 is not affected, so that the entire backlight structure is more complete.

The backlight structure and liquid crystal display provided in the embodiments of the present invention are described in detail above. Specific cases are used in this specification for describing principles and implementations of the present invention. The descriptions of the embodiments are merely for ease of understanding the present invention. Meanwhile, a person skilled in the art may make modifications in terms of the specific implementations and application scopes according to the idea of the present invention. In conclusion, the content of this specification should not be construed as a limit to the present invention.

What is claimed is:

1. A backlight structure, comprising:
    a heat sink comprising a first heat dissipation plate;
    a glass back plate disposed opposite to the first heat dissipation plate, and comprising a glass plate body and a glass plate through hole formed through the glass plate body;
    a heat sink through hole formed through the first heat dissipation plate;
    at least one buckle connected to the glass back plate and the heat sink, and formed a gap between the glass back plate and the first heat dissipation plate, wherein the buckle comprises a buckle body, a first groove recessed from a bottom surface of the buckle body and disposed opposite to the heat sink through hole, and a second groove recessed from one side surface of the buckle body, wherein a part of the buckle body is inserted into the glass plate through hole, and a part of the glass plate body is clamped into the second groove; and
    a gasket layer disposed on an upper surface of the glass back plate and comprising a third through hole disposed opposite to the glass plate through hole, and a top of the buckle is inserted into the third through hole.

2. The backlight structure according to claim 1, wherein the buckle is detachably connected to the heat sink, and/or the buckle is detachably connected to the glass back plate.

3. The backlight structure according to claim 1, wherein the backlight structure comprises a locking member detachably inserted into the heat sink through hole and the first groove and screwed to the heat sink and the buckle.

4. The backlight structure according to claim 1, wherein the glass back plate comprises a glass plate boss protruded from an inner side wall of the glass plate through hole, and the glass plate boss is clamped into the second groove.

5. The backlight structure according to claim 1, wherein the glass plate body at the edge of the glass plate through hole is partially clamped into the second groove.

6. A liquid crystal display, comprising the backlight structure according to claim 1.

7. A backlight structure, comprising:
a heat sink comprising a first heat dissipation plate and a second heat dissipation plate perpendicularly connected to one end of the first heat dissipation plate;
resin frames comprising a first resin frame and a second resin frame, wherein the second resin frame is disposed above the second heat dissipation plate and parallel with the first heat dissipation plate, and the first resin frame is disposed opposite to the second heat dissipation plate and perpendicularly connected to the first resin frame;
back frame comprising a first back frame and a second back frame, wherein the first back frame is disposed opposite to the first resin frame and parallel with the first resin frame, and the second back frame is perpendicularly connected to one end of the first back frame and is disposed above the second resin frame;
a glass back plate disposed opposite to the first heat dissipation plate;
at least one buckle connected to the glass back plate and the heat sink, and formed a gap between the glass back plate and the first heat dissipation plate;
a polarizer attached to one side of the glass back plate or the gasket layer opposite to another side facing the first heat dissipation plate;
a light guide plate attached to one side of the polarizer opposite to another side facing the glass back plate;
a film attached to one side of the light guide plate opposite to another side facing the polarizer; and
a backlight source disposed on one side of the second heat dissipation plate facing the light guide plate.

8. The backlight structure according to claim 7, wherein the buckle is detachably connected to the heat sink, and/or the buckle is detachably connected to the glass back plate.

9. A liquid crystal display, comprising the backlight structure according to claim 7.

* * * * *